United States Patent
Farley et al.

(10) Patent No.: US 6,336,076 B1
(45) Date of Patent: Jan. 1, 2002

(54) LONG RANGE GNSS EPHEMERIS DATA TRANSFER METHOD AND APPARATUS USING THE SAME

(75) Inventors: Michael G. Farley; Joseph M. Strus; Susan R. Schellenberg, all of Cedar Rapids; Mitchell A. Corcoran, Mount Vernon, all of IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/138,883

(22) Filed: Aug. 24, 1998

(51) Int. Cl.[7] .............................. G01S 5/02; H04B 7/185
(52) U.S. Cl. .................. 701/213; 701/214; 342/357.09
(58) Field of Search ................................ 701/213, 214, 701/215; 342/357.09, 357.06, 358, 357.1, 357.12

(56) References Cited

U.S. PATENT DOCUMENTS

| | | | | |
|---|---|---|---|---|
| 5,311,194 A | * | 5/1994 | Brown | 342/357 |
| 5,613,194 A | * | 3/1997 | Olds et al. | 455/12.1 |
| 5,731,786 A | * | 3/1998 | Abraham et al. | 342/357 |
| 5,752,218 A | * | 5/1998 | Harrison et al. | 701/207 |
| 5,808,581 A | * | 9/1998 | Braisted et al. | 342/357 |
| 5,866,838 A | * | 2/1999 | Mayersak | 89/1.56 |
| 5,886,665 A | * | 3/1999 | Dosh et al. | 342/357 |
| 5,886,666 A | * | 3/1999 | Schellenberg et al. | 342/357 |
| 5,917,444 A | * | 6/1999 | Loomis et al. | 342/357 |
| 6,009,335 A | * | 12/1999 | Murphy | 455/562 |
| 6,031,487 A | * | 2/2000 | Mickelson | 342/357.12 |
| 6,067,484 A | * | 5/2000 | Rowson et al. | 701/16 |
| 6,133,874 A | * | 10/2000 | Krasner | 342/357.15 |

* cited by examiner

Primary Examiner—Tan Nguyen
Assistant Examiner—Dalena Tran
(74) Attorney, Agent, or Firm—Nathan O. Jensen; Kyle Eppele

(57) ABSTRACT

Disclosed are methods of transferring satellite ephemeris data for a first GNSS satellite from a pseudolite to a GNSS receiver. Also disclosed are pseudolites and GNSS receivers implementing the same. A first satellite global positioning signal transmitted by the first GNSS satellite is received at the pseudolite. The pseudolite transmits a pseudolite global positioning signal containing the satellite ephemeris data for the first GNSS satellite. The GNSS receiver receives the pseudolite global positioning signal and retrieves from the pseudolite signal the satellite ephemeris data.

5 Claims, 4 Drawing Sheets

LONG RANGE GNSS EPHEMERIS DATA TRANSFER METHOD AND APPARATUS USING THE SAME

FIELD OF THE INVENTION

The present invention relates to satellite navigation and positioning systems. More particularly, the present invention relates to a pseudo-satellite (pseudolite) navigation system which enhances operation of a global navigational satellite system (GNSS) when satellite ephemeris data is unavailable.

BACKGROUND OF THE INVENTION

Global navigational satellite systems (GNSS) are known and include the global positioning system (GPS) and the Russian global orbiting navigational satellite system (GLONASS). GNSS-based navigational systems are used for navigation and positioning applications. In the GPS navigational system, GPS receivers receive satellite positioning signals from a set of up to 32 satellites deployed in 12-hour orbits about earth and dispersed in six orbital planes at an altitude of 10,900 nautical miles. Each GPS satellite continuously transmits two spread spectrum, L-band signals: an L1 signal having a frequency f1 of 1575.42 MHz, and an L2 signal having a frequency f2 of 1227.6 MHz. The L1 signal from each satellite is modulated by two pseudo-random codes, the coarse acquisition (C/A) code and the P-code. The P-code is normally encrypted, with the encrypted version of the P-code referred to as the Y-code. The L2 signal from each satellite is modulated by the Y-code. The C/A code is available for non-military uses, while the P-code (Y-code is reserved for military uses.

Conventional GPS navigational systems determine positions by timing how long it takes the coded radio GPS signal to reach the receiver from a particular satellite (e.g., the travel time). The receiver generates a set of codes identical to those codes (e.g., the Y-code or the C/A-code) transmitted by the satellites. To calculate the travel time, the receiver determines how far it has to shift its own codes to match the codes transmitted by the satellites. The determined travel times for each satellite are multiplied by the speed of light to determine the distances from the satellites to the receiver.

By receiving GPS signals from four or more satellites, a receiver unit can accurately determine its position in three dimensions (e.g., longitude, latitude, and altitude). A conventional GPS receiver typically utilizes the fourth satellite to accommodate a timing offset between the clocks in the receiver and the clocks in the satellites. The GPS signals also include a 50 bit per second data stream or data message which is superimposed on the C/A and Y-codes. Once the receiver has matched its code to the code in the GPS signal from a particular satellite, the receiver can decipher the data message. The data message can include navigational data related to the position of the satellite, including geometric dilution of precision (GDOP) parameters. Additionally, the data message can include accurate time data, ephemeris data, and data related to the health status of the satellite. The GPS satellites utilize code division multiple access techniques so satellite signals do not interfere with each other. GLONASS navigational systems operate similarly to GPS navigational systems and utilize frequency division multiple access (FDMA) techniques so satellite signals do not interfere with each other.

GNSS navigational systems have tremendous benefits over other positioning and navigational systems because these systems do not rely upon visual, magnetic or other points of reference. However, conventional GNSS navigational systems are susceptible to jamming by higher power signals. When jammed by higher power signals, the C/A-code encoded signal is difficult to acquire. Typically C/A-code acquisition is necessary to acquire the Y-code signal. Therefore, in the presence of jamming signals, navigation using a GNSS receiver can prove problematic.

SUMMARY OF THE INVENTION

Disclosed are methods of transferring satellite ephemeris data for a first GNSS satellite from a pseudolite to a GNSS receiver. Also disclosed are pseudolites and GNSS receivers implementing the same. A first satellite global positioning signal transmitted by the first GNSS satellite is received at the pseudolite. The pseudolite transmits a pseudolite global positioning signal containing the satellite ephemeris data for the first GNSS satellite. The GNSS receiver receives the pseudolite global positioning signal and retrieves from the pseudolite signal the satellite ephemeris data.

DETAILED DESCRIPTION OF THE PREFERRED EMBODIMENTS

The present invention includes pseudolites GNSS receivers and navigation systems adapted to implement a method of enhancing GNSS performance when satellite ephemeris data is not available due to jamming or other reasons. Without ephemeris data, many GNSS receivers are programmed not to provide an accurate navigation solution. According to the methods implemented by the present invention, GNSS satellite ephemeris data is transferred from a tracking receiver to a distant "cold" receiver, which is itself unable to track the GNSS satellite signals due to jamming or other interference. The ephemeris data transfer method, when combined with a pseudolite navigation system, provides the benefit of allowing existing GNSS receivers to perform direct Y-code satellite signal acquisition without a hardware retrofit. Also, almanac data can be transferred from the tracking receiver to the distant cold receiver and used to assist in direct Y-code acquisition. The methods of the present invention support a pseudolite operational concept which allows use of the existing 32 Gold codes reserved for GPS satellites without interfering with positioning signals from visible satellites. While the present invention is frequently described with reference to certain characteristics of the GPS, the present invention can be used with other GNSS as well.

Figure 1:
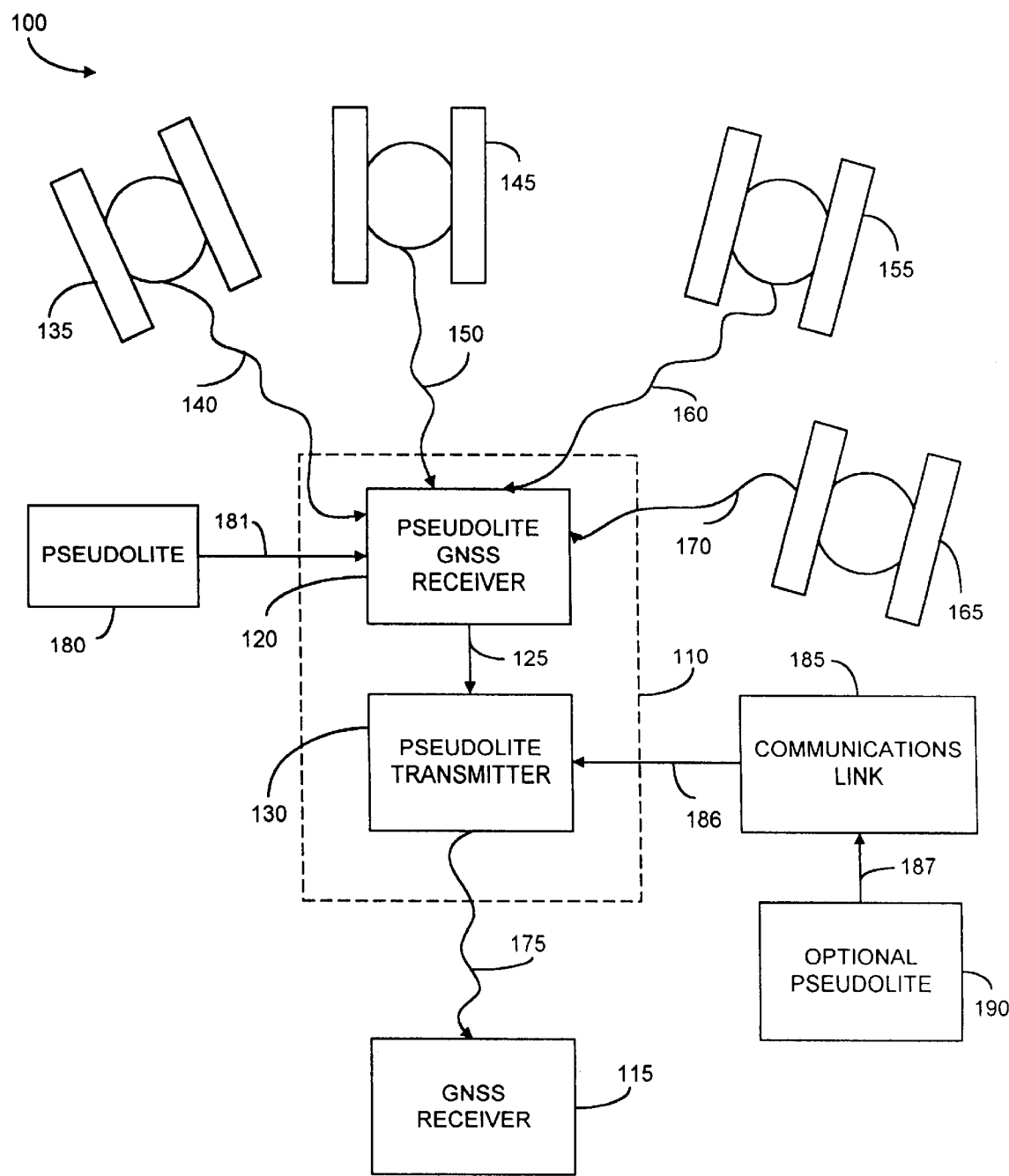
FIG. 1 is a diagrammatic illustration of a pseudolite enhanced GNSS in accordance with preferred embodiments of the present invention.

FIG. 1 is a diagrammatic illustration of navigation system 100 in accordance with embodiments of the present invention. Navigation system 100 includes pseudolite 110 and GNSS receiver 115. Pseudolite 110 includes pseudolite GNSS receiver 120 (the "tracking receiver") and pseudolite transmitter 130. GNSS receiver 115 is the "cold receiver" experiencing difficulty tracking satellite signals.

Visible GNSS satellites 135, 145, 155 and 165 transmit global positioning signals 140, 150, 160 and 170, respectively. In some embodiments, pseudolite 180 transmits pseudolite global positioning signal 181. The term "visible" as used herein with reference to the availability of GNSS satellite global positioning signals means that there are not currently any obstructions (e.g., the earth) between the satellite and the GNSS receiver which will block the positioning signal. The global positioning signals can be, for example, in the GPS satellite signal data format containing satellite or pseudolite ephemeris and other data.

GNSS receiver 115 can operate in an environment in which the relatively low power satellite positioning signals 140, 150, 160 and 170 are not received with sufficient power to allow acquisition of the C/A-code in the presence of a jamming signal. With pseudolite 110 preferably located a sufficient distance from the high jamming environment in which GNSS receiver 115 is located, pseudolite GNSS receiver 120 receives satellite positioning signals 140, 150, 160, 170 and 181, and uses known techniques to determine the current position of pseudolite 110 based upon the positioning signals. Pseudolite GNSS receiver 120 also identifies and stores satellite and/or pseudolite ephemeris and/or almanac data from signals 140, 150, 160, 170 and 181. Pseudolite transmitter 130 of pseudolite 110 receives the position information and ephemeris/almanac information 125 from pseudolite GNSS receiver 120, and generates pseudolite global positioning signal 175 which is received by GNSS receiver 115. Signal 175 is a ranging signal transmitted with sufficiently high power such that it is received and processed by GNSS receiver 115 with minimal adverse jamming effects. Signal 175 can be continuously broadcast, or can be a pulsed signal.

While in some preferred embodiments pseudolite 110 obtains ephemeris, time and/or almanac data from other pseudolites or satellites, in other embodiments pseudolite 110 obtains this information via connections 186 and 187 through a communications link 185 that may or may not be connected to one or more other optional pseudolites 190. Communications link 185 can be an RF link, a local area network (LAN), or other types of communications links. However, communications link 185 is not required in all embodiments. The distance separating the locations of pseudolite 110 and GNSS receiver 115 may contain multiple pseudolite links.

Figure 2:
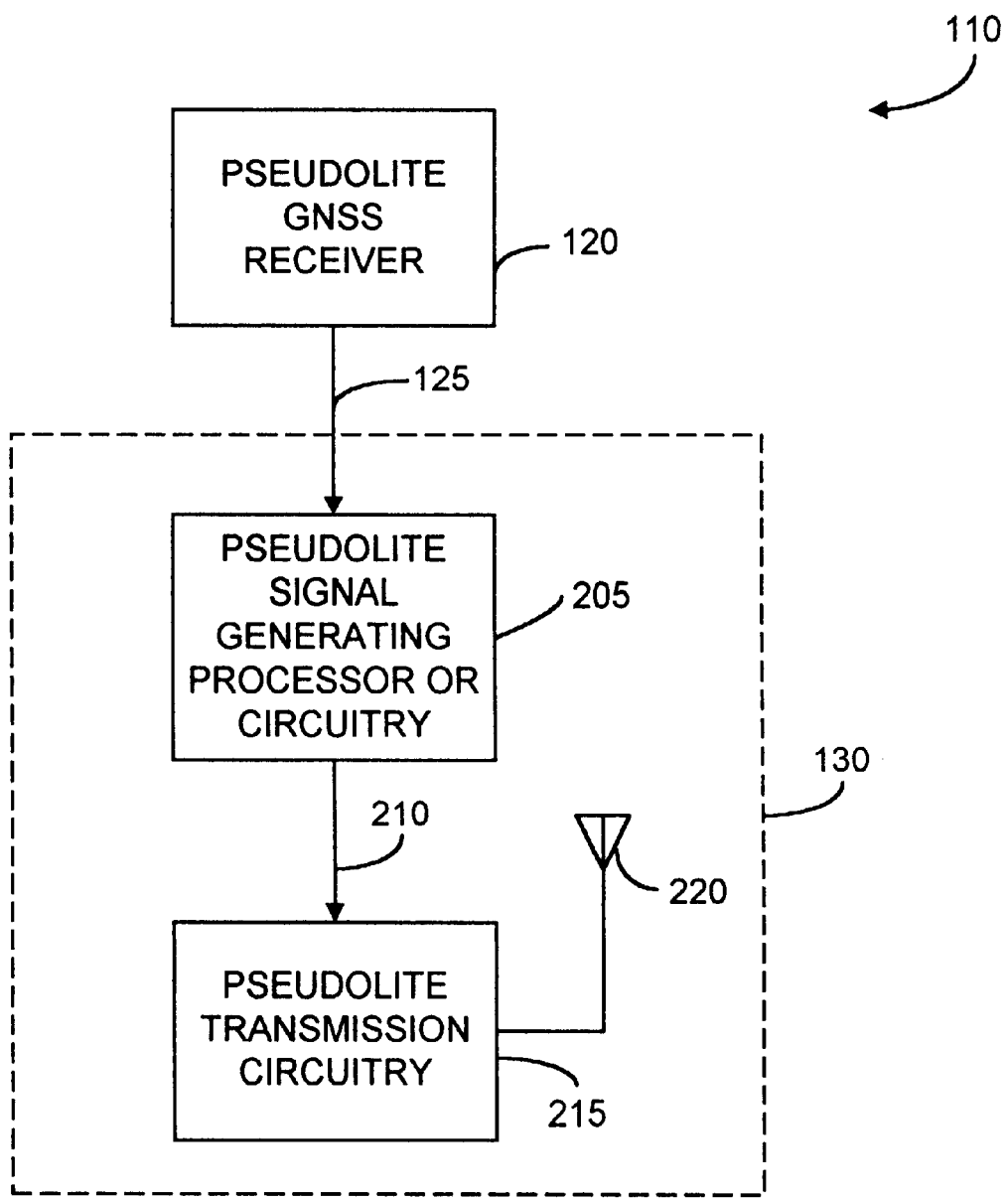
FIG. 2 is a block diagram illustrating in greater detail the pseudolite shown in FIG. 1.

FIG. 2 is a block diagram illustrating in greater detail pseudolite 110 in accordance with some embodiments of the present invention. As illustrated, pseudolite 110 includes pseudolite GNSS receiver 120 and pseudolite transmitter 130. Pseudolite transmitter 130 includes pseudolite signal generating processor or circuitry 205, pseudolite transmission circuitry 215 and transmission antenna 220. Pseudolite GNSS receiver 120 provides pseudolite position and satellite ephemeris information via connections 125 to pseudolite signal generating processor 205. Processor 205 generates pseudolite global positioning signal 210, which will eventually be transmitted by pseudolite transmission circuitry 215 and antenna 220 as pseudolite global positioning signal 175. As discussed below in greater detail, pseudolite signal generating processor 205 generates signal 210 such that it describes the current position of pseudolite 110. Processor 205 also generates signal 210 such that it contains satellite ephemeris data received by pseudolite GNSS receiver 120 from the visible GNSS satellites and/or pseudolite ephemeris data received from other pseudolites 180 and 190. Thus, the satellite/pseudolite ephemeris data is transferred via signal 175 to GNSS receiver 115. These and other characteristics of pseudolite global positioning signal 175 are discussed below in greater detail.

Figure 3:
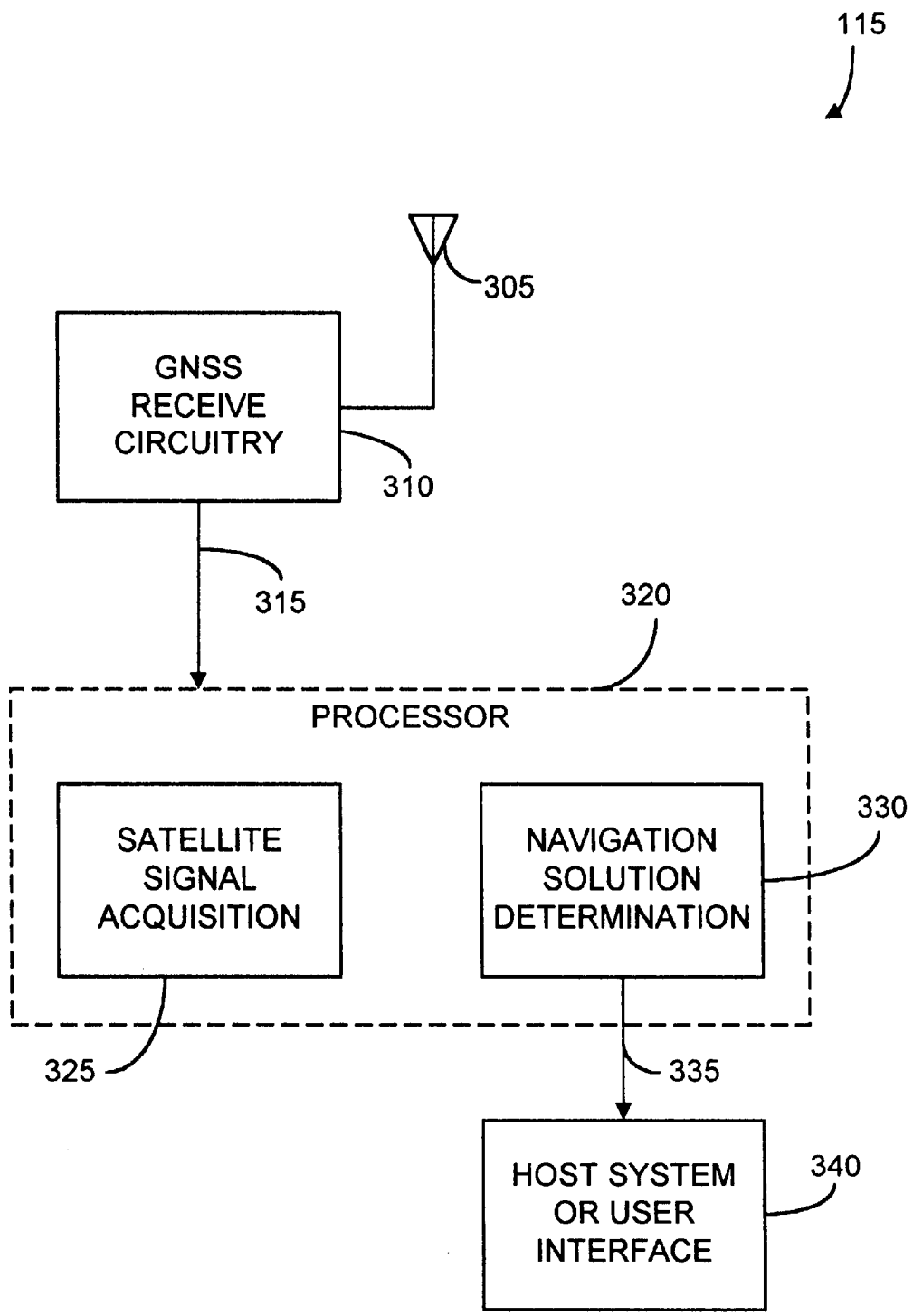
FIG. 3 is a block diagram illustrating in greater detail the GNSS receiver shown in FIG. 1.

FIG. 3 is a block diagram illustrating GNSS receiver 115 in greater detail. Generally, GNSS receiver 115 includes substantially the same components as existing GNSS receivers adapted to receive only GNSS satellite positioning signals. However, GNSS receiver 115 includes slight modifications which allow it to receive satellite ephemeris data for the "visible" GNSS satellites and for other pseudolites from positioning signal 175. Generally, GNSS receiver 115 includes antenna 305, GNSS receive circuitry 310, processor 320 and host system or user interface 340. Antenna 305 receives pseudolite positioning signal 175 and, if available, GNSS satellite positioning signals from visible satellites and other pseudolite positioning signals. Receive circuitry 310 receives the signals from antenna 305 and provides data 315 to processor 320. Processor 320 implements satellite signal acquisition functions 325 and navigation solution determination functions 330. The satellite signal acquisition functions 325 include utilizing the satellite ephemeris data transferred from pseudolite 110 to achieve a direct Y-code acquisition of the GNSS satellite positioning signals which were previously unavailable due to the presence of jamming signals. The navigation solution 335 determined by processor 320 is provided to host system or user interface 340. The navigation solution can be determined as a function of pseudolite ranging signals, GNSS satellite ranging signals, or a combination of both.

As discussed above, signal 175 transmitted by pseudolite 110 has several unique features. First, signal 175 can be a modified version of the conventional GPS satellite ephemeris message that, combined with Keplerian equation changes in receiver 115, sums in the receiver to describe a fixed position. A method of using a modified ephemeris message to transmit a fixed position of a ground based pseudolite is disclosed in co-pending and commonly assigned U.S. patent application Ser. No. 08/972,269, filed Nov. 18, 1997, and entitled AUTONOMOUS LOCAL INDOOR AND OUTDOOR NAVIGATIONAL SYSTEM, which is herein incorporated by reference. The fixed location described by the pseudolite positioning signal 175 is the position of pseudolite 110 determined by pseudolite GNSS receiver 120.

A second unique feature of global positioning signal 175 transmitted by pseudolite 110 is that it utilizes a modified form of the basic GPS ICD 200 data structure in order to take advantage of the unique properties of pseudolite ephemeris data to accomplish ephemeris data transfer for satellites and/or other pseudolites. Pseudolite 110 broadcasts the pseudolite five subframe GPS message data that describe its location, the location of another pseudolite, or the location of a GNSS satellite. The five subframe message data broadcast includes the ephemeris data for a GPS satellite (i.e., one of satellites 135, 145, 155 and 165) or a pseudolite. This cycle is repeated where every frame contains ephemeris for the broadcasting pseudolite, for a visible GPS satellite, or for a nearby pseudolite. Although transmitting pseudolite and satellite ephemeris data in alternating frames (for example transmitting ephemeris data for pseudolite 110 during odd numbered frames and transmitting ephemeris data for other pseudolites or satellites during even numbered frames) is preferred in some embodiments, other alternating broadcast patterns can be used for ephemeris data transfer. Once all visible (or tracked) GPS satellite and pseudolite ephemeris messages have been transmitted, the cycle repeats. Receiver 115 is able to collect valid ephemeris data for the GPS satellites in addition to almanac data. Using the transferred satellite ephemeris data, with a good estimate of GPS time and position (using a pseudolite navigation constellation or other methods), receiver 115 is able to perform direct Y-code satellite acquisition of satellite signals 140, 150, 160 and 170. In the alternative, it is possible to transfer satellite almanac data in signal 175 and to use almanac data instead of ephemeris data to perform direct Y-code acquisition.

Figure 4:
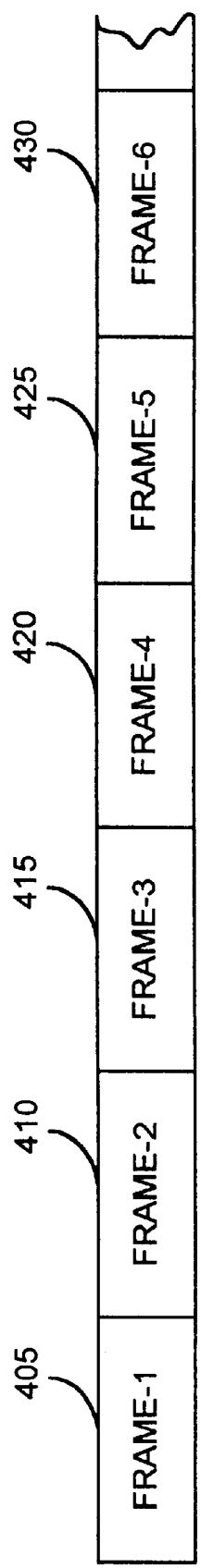
FIG. 4 is a diagrammatic illustration of a transmission message format utilized by the pseudolite shown in FIGS. 1 and 2.

FIG. 4 is a diagrammatic illustration of a message format of pseudolite global positioning signal 175 in accordance with an embodiment of the present invention. As discussed above, signal 175 can be in a format which is similar to a standard GPS five subframe GPS message data format. However, in the present invention, some (for example half) of the frames are used to transmit ephemeris data from visible satellites or other pseudolites, while other of the frames are used to describe the position of and to provide other information relevant to pseudolite 110. For example, FRAME-1 405, FRAME-3 415 and FRAME-5 425 can be used to transmit ephemeris, almanac and position information for pseudolite 110. FRAME-2 410, FRAME-4 420 and FRAME-6 430 can be used to transfer ephemeris and/or almanac data from visible satellites 135, 145, 155 and 165, or other pseudolites 180 and 190.

The ephemeris data structure for the subframes of each frame illustrated in FIG. 4 can be substantially the same as the GPS satellite block IIF flexible data message structure, with a few slight modifications to accommodate the transfer of satellite ephemeris data. The modifications are discussed below and are described in Table 1. GNSS receiver 115 is also programmed to accommodate the slight modifications to the data structure.

When this modified form is in use, the subframe ID in the handover word is changed. Three of the possible eight three-bit subframe ID patterns (bits D20, D21, and D22 of each subframe handover word) are not currently used (000, 110, or 111). In embodiments of the present invention, when one of these values are detected by receiver 115 in signal 175, the IODC/IODE data in the subframe is redefined. Subframes 1, 2, and 3 of the same frame contain ephemeris and clock data for the satellite, or other pseudolite, whose ID is the six least significant bits of the IODE and IODC of the current frame. The seventh least significant bit is used to denote whether the ephemeris data corresponds to the pseudolite Kepler equation set or to the GPS ICD 200 equation set. Table 1 summarizes these changes from the standard definition to the data transfer definition of the present invention.

TABLE 1

| Item | Standard Definition | Data Transfer Definition |
|---|---|---|
| Subframe ID | 1-indicates SF 1 data<br>2-indicates SF 2 data<br>3-indicates SF 3 data | 0-indicates SF 1 data, IODC/IODE is used to determine the satellite ID and ephemeris format associated with this data.<br>6-indicates SF2 data, IODC/IODE is used to determine the satellite ID and ephemeris format associated with this data.<br>7-indicates SF3 data, IODC/IODE is used to determine the satellite ID and ephemeris format associated with this data. |
| IODC/IODE | The IODC/IODE changes whenever the ephemeris data is updated.<br>If the SF1 IODC=SF2 | The ID of the satellite/pseudolite whose ephemeris is currently being transferred is encoded in the IODC/IODE for subframes whose |

TABLE 1-continued

| Item | Standard Definition | Data Transfer Definition |
|---|---|---|
| | IODE=SF3 IODE, a consistent set of ephemeris data has been collected. | subframe ID is 0, 6, or 7. The eighth least sig. bit toggles between 0 and 1 whenever the ephemeris for the specified satellite or pseudolite changes. A seventh least sig. bit value of "0" indicates the ephemeris data is a standard ICD-GPS-200 defined ephemeris data set. A seventh least sig. bit value of "1" indicates the ephemeris data is pseudolite ephemeris data. |

First priority for receiver 115 is still normal GPS (or GNSS) operation. In the event that GPS satellites are completely jammed or that less than four are trackable for navigation, receiver 115 searches all 32 PRN codes. With pseudolite reference receiver 120 tracking GPS satellites, pseudolite signal generating processor 205 determines which of the 32 PRN codes are being used by visible satellites, and pseudolite 110 broadcasts using a GPS PRN code of a satellite that is not currently visible. If high power pseudolites are transmitting one of the non visible PRN codes, receiver 115 will eventually find a pseudolite signal 175 using one of the 32 codes. Nonparticipating receivers should be unaffected since they will typically be searching for satellites listed as visible in the almanac. Use of one of the 32 existing GPS satellite codes minimizes software changes needed in existing GPS receivers. If the satellite whose code is being used by pseudolite 110 becomes visible, pseudolite 110 simply switches codes.

The subframe ID in the handover word alerts receiver 115 that it is tracking the data transfer ephemeris structure. Collection of pseudolite and GPS ephemeris data will begin in receiver 115. If necessary, the receiver 115 can track four pseudolites (each substantially similar to pseudolite 110) in order to have a good estimate of time and positioning with which to try direct Y-code acquisition of signals from the GPS satellite constellation. In general, the satellite ephemeris data transfer method of the present invention allows direct acquisition of the Y-code satellite signals by receiver 115, without having to first acquire the more easily jammed C/A-code signals.

Although the present invention has been described with reference to preferred embodiments, workers skilled in the art will recognize that changes may be made in form and detail without departing from the spirit and scope of the invention. For example, while the present invention is sometimes described with reference to transfer of satellite ephemeris data to a distant jammed receiver, pseudolite 110 of the present invention can also transfer ephemeris data from other pseudolites to receiver 115. While the present invention is described primarily with reference to pseudolite 110 obtaining ephemeris data from other pseudolites and/or other satellites through receipt of global positioning signals, the ephemeris data transferred by pseudolite 110 can be obtained through communications link 185. Also, while pseudolite global positioning signal 175 is preferably in a standard GPS format, other formats can be used to transfer the satellite and/or pseudolite ephemeris data. Further, while signal 175 is preferably an L-band signal to minimize hardware changes required within existing receivers, other frequencies can be used as well. Also, while the present invention is illustrated as being implemented with circuitry,

What is claimed is:

1. A method of providing satellite data for a first global navigation satellite system (GNSS) satellite to a GNSS receiver, the method comprising:

receiving at a pseudolite a first satellite global positioning signal transmitted by the first GNSS satellite, the first satellite global positioning signal containing the satellite data for the first GNSS satellite, wherein the satellite data for the first GNSS satellite includes ephemeris data for the first GNSS satellite;

generating a pseudolite global positioning signal in a global positioning system (GPS) data message format including a plurality of frames of data, wherein some of the plurality of frames describe the ephemeris data for the pseudolite, wherein others of the plurality of frames describe the ephemeris data for the first GNSS satellite, and wherein the pseudolite global positioning signal is in a modified GPS satellite block II flexible data message structure;

transmitting from the pseudolite the pseudolite global positioning signal, the pseudolite global positioning signal containing the satellite data for the first GNSS satellite;

receiving at the GNSS receiver the pseudolite global positioning signal transmitted by the pseudolite;

retrieving in the GNSS receiver the satellite data for the first GNSS satellite from the pseudolite global positioning signal; and wherein the ephemeris data for the first GNSS satellite which is contained in the pseudolite global positioning signal allows the GNSS receiver to directly acquire a Y-code in the first satellite global positioning signal.

2. The method of claim 1, wherein the GNSS receiver is operating at a first location at which jamming signals are interfering with acquisition of a C/A code in the first satellite global positioning signal, wherein the step of receiving at the pseudolite the first satellite global positioning signal further comprises positioning the pseudolite at a second location spaced apart from the first location such that the jamming signals do not interfere with acquisition by the pseudolite of the C/A code in the first satellite global positioning signal, however, the distance separating the two locations may contain multiple pseudolite navigation links and wherein the step of transmitting from the pseudolite the pseudolite global positioning signal further comprises transmitting the pseudolite global positioning signal at a power level which allows the GNSS receiver to acquire a C/A code in the pseudolite global positioning signal while operating at the first location.

3. A pseudolite for use in a navigation system, the pseudolite comprising:

a pseudolite communications link comprised of a GNSS receiver which receives global positioning signals containing ephemeris data from at least one of a plurality of GNSS satellites and other pseudolites; and a pseudolite transmitter coupled to the communications link and receiving the ephemeris data, the pseudolite transmitter being adapted to generate and transmit a first pseudolite global positioning signal such that the pseudolite global positioning signal is in a global positioning system (GPS) data message format including a plurality of frames of data, wherein some of the plurality of frames of data describe the ephemeris data for the pseudolite, and wherein others of the plurality of frames of data describe the ephemeris data for the at least one of the plurality of GNSS satellites and other pseudolites;

wherein a subframe identification in a handover word of the first pseudolite global positioning signal contains data which distinguishes pseudolite global positioning signals from global positioning signals from GNSS satellites.

4. The pseudolite of claim 3, wherein in the first pseudolite global positioning signal, if the subframe identification in the handover word has a value equal to one of 000, 010 and 111, then an identification of the GNSS satellite or other pseudolites whose ephemeris data is currently contained in the pseudolite global positioning signal is included in the current frame.

5. The pseudolite of claim 3, wherein the first pseudolite global positioning signal is in a modified GPS satellite block II flexible data message structure.

* * * * *